G. A. LYON.
AUTOMOBILE BUFFER.
APPLICATION FILED JUNE 28, 1919.
1,325,742.
Patented Dec. 23, 1919.
2 SHEETS—SHEET 1.
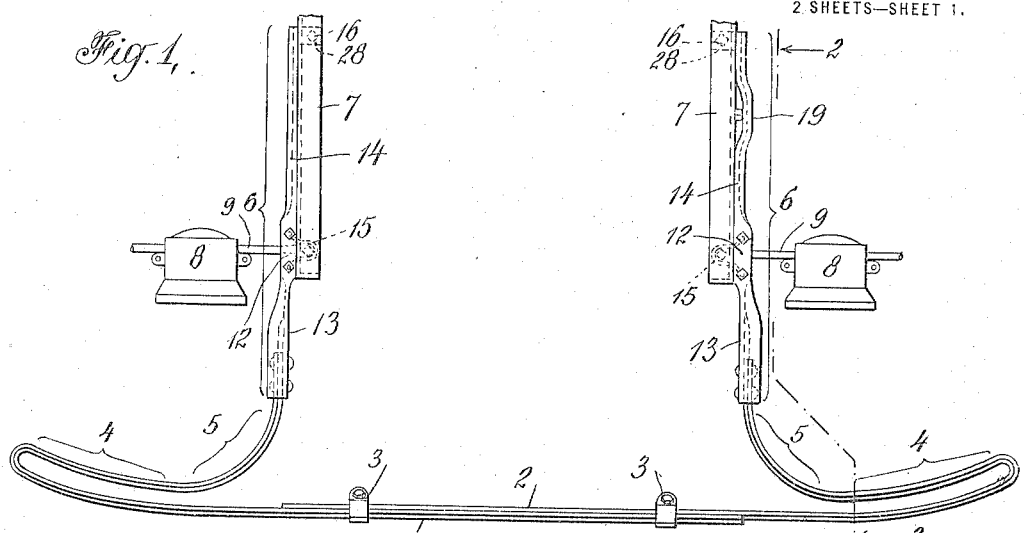
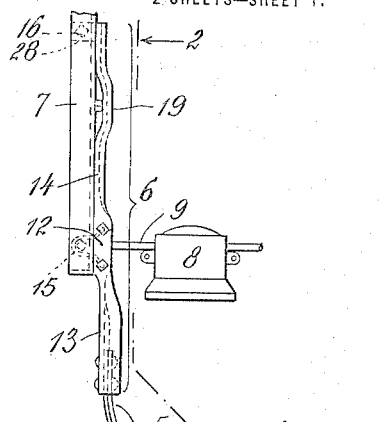
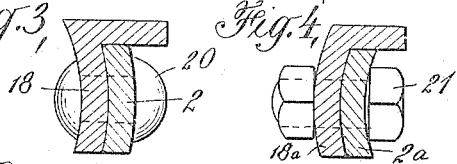
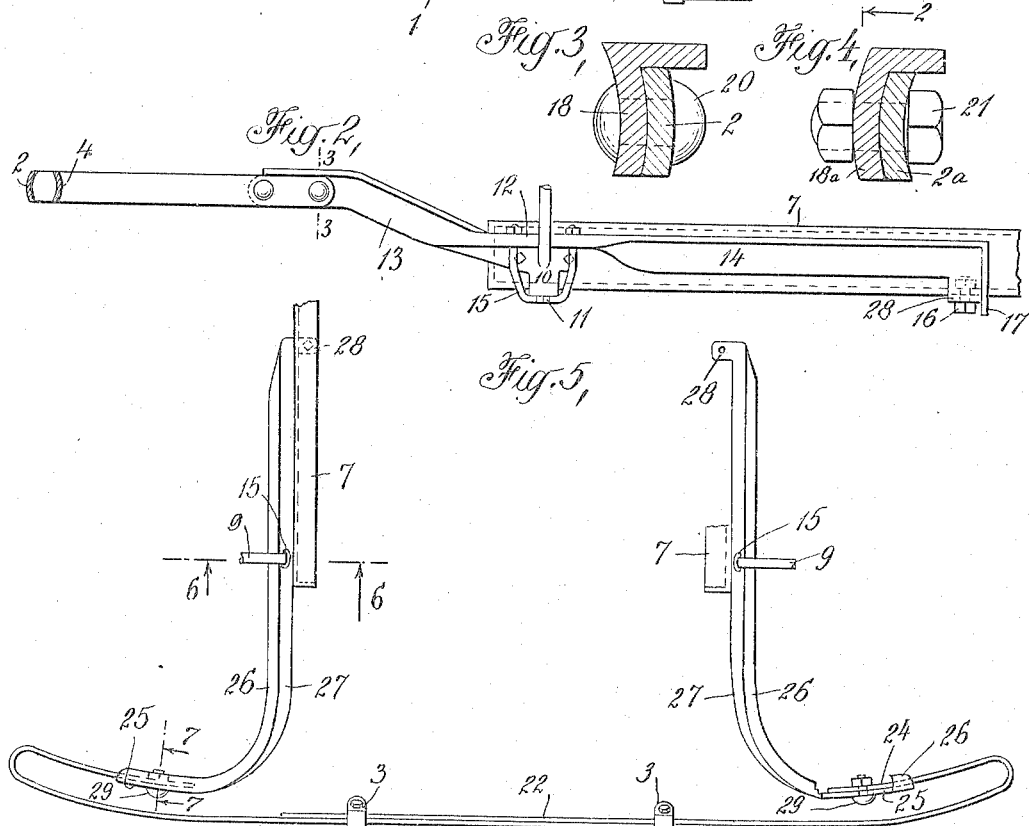
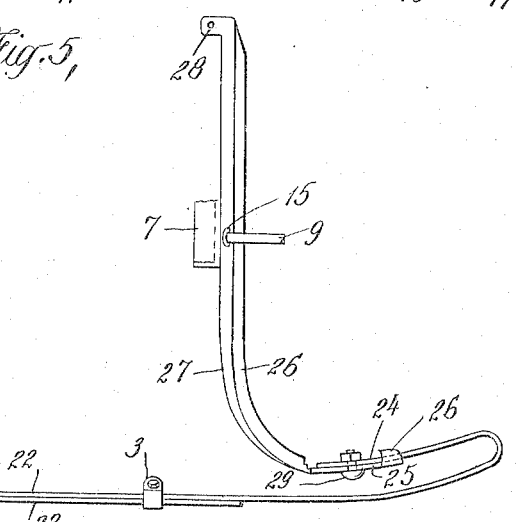
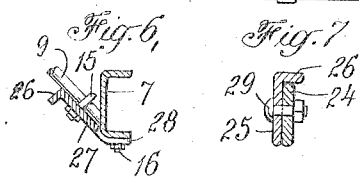
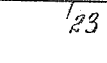
Inventor
George Albert Lyon
By his Attorney
Harry L. Duncan G. A. LYON.
AUTOMOBILE BUFFER.
APPLICATION FILED JUNE 28, 1919.
1,325,742.
Patented Dec. 23, 1919.
2 SHEETS—SHEET 2.
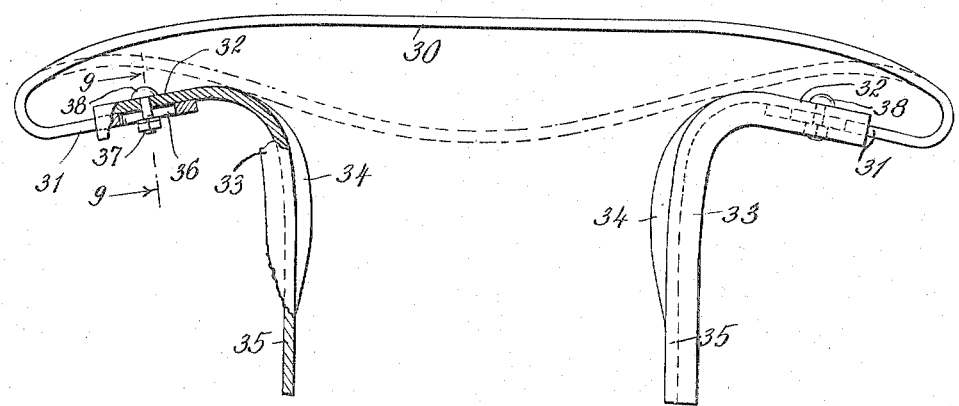
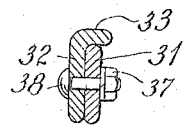
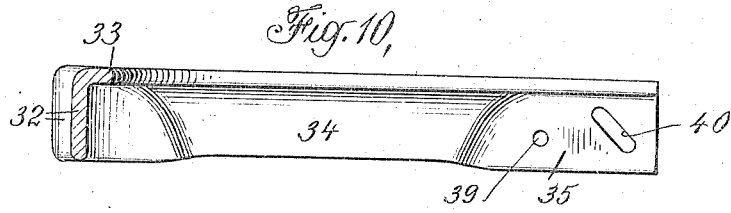
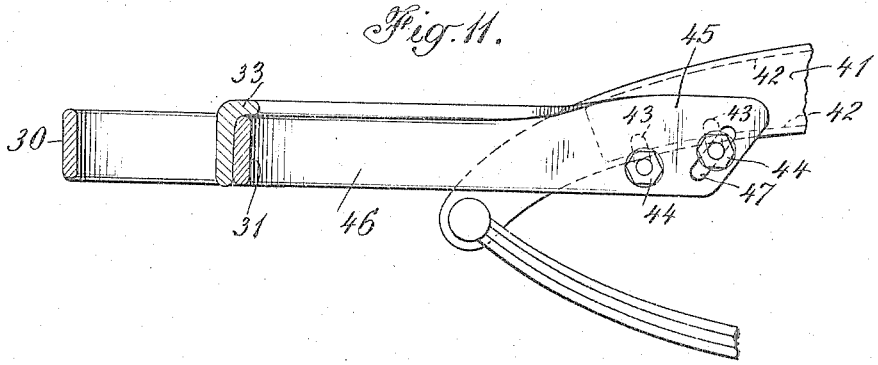
Inventor
George Albert Lyon
By his Attorney
Harry L. Duncan

UNITED STATES PATENT OFFICE.

GEORGE ALBERT LYON, OF PHILADELPHIA, PENNSYLVANIA.

AUTOMOBILE-BUFFER.

1,325,742.                Specification of Letters Patent.      Patented Dec. 23, 1919.

Application filed June 28, 1919. Serial No. 307,333.

*To all whom it may concern:*

Be it known that I, GEORGE ALBERT LYON, a citizen of the United States, and resident of Philadelphia, county of Philadelphia, State of Pennsylvania, have made a certain new and useful Invention Relating to Automobile-Buffers, of which the following is a specification, taken in connection with the accompanying drawing.

The invention of this application which is a continuation in part of my co-pending application, Serial No. 194,855, filed October 5, 1917, that is, contains subject-matter taken therefrom, relates especially to automobile buffers formed of resilient strips of steel or other metal and in which the connecting portion of one of the coöperating strips is formed with an alining or stiffening flange against which the other coöperating strip or member may be clamped or otherwise secured to give greater strength and accuracy of alinement to the connection. The buffer front or impact receiving member may be formed of one or more resilient strips of tempered spring steel, for example, and the coöperating attaching members, which are adapted to support the buffer front and may be connected or clamped to an automobile frame, may advantageously be formed with an integral alining flange on the upper edge of these attaching members to which the coöperating buffer member may be clamped or bolted so as to be more or less concealed thereby and more securely and rigidly held in desired alined position.

In the accompanying drawings which show in a somewhat diagrammatic way illustrative embodiments of the invention, Figure 1 is a plan view of a buffer and connected supporting devices secured to a Ford automobile.

Fig. 2 is a view taken substantially along the line 2—2 of Fig. 1.

Fig. 3 is an enlarged transverse section through one type of coöperating connection portions which may be used in this case.

Fig. 4 is a corresponding sectional view showing another form of connection.

Fig. 5 is a plan view of another form of automobile buffer.

Fig. 6 is a transverse section thereof taken substantially along the line 6—6 of Fig. 5.

Fig. 7 is a somewhat enlarged sectional view taken along the line 7—7 of Fig. 5.

Fig. 8 is a plan view showing still another form of buffer.

Fig. 9 is an enlarged sectional view thereof taken along the line 9—9 of Fig. 8.

Fig. 10 is a side sectional view of the attaching member; and

Fig. 11 is a side sectional view showing another form of buffer.

The resilient front portion of the buffer shown in Fig. 1 may consist of two resilient or spring steel strips 1 and 2 extending transversely across the front of the automobile, the central portions of these strips overlapping one another and being held in position by any suitable clips 3, each strip or bar being then turned back on itself so as to form an end loop 4 which is preferably bent slightly rearward and joined by a curved portion 5 to a connecting portion which is adapted to be bolted or otherwise connected to the relatively rigid extension or attaching member 6 of the buffer. This attaching member which is preferably of stiffened flanged construction may be bolted or otherwise connected to the front of one of the side frames 7 of the automobile.

This may be effected by using the arm 9 of the headlight or lamp 8 secured to each of the side frames of the ordinary Ford automobile and usually extending from a bracket 10 which engages the outer side of the car frame 7 and extends beneath the lower flange thereof to which it may be secured by a nut 11. The relatively rigid attaching member of the buffer may comprise three parts 12, 13, 14, the forward and rear portions 13 and 14 being preferably of flanged or right angled cross-section and the intermediate portion 12 being, if desired, a horizontal plate or connector portion which connects the forward and rear ends of this member and may rest upon the lamp or arm 9 and its bracket 10. These parts may be held in firm and rigid contact by means of a yoke or securing U-bolt 15 whose lower looped portion may extend beneath the horizontal part of the bracket 10 and engage the securing bolt 11 thereof and the upwardly projecting ends of this securing bolt may pass through openings in the plate 12 and be threaded for engagement by nuts which bear upon the top of the plate 12 as shown in Figs. 1 and 2. The rear end of this attaching member may be bent downward beneath the bottom flange of the side frame 7 of the automobile so that this portion 28 may be bolted in position by the bolt 16, a laterally projecting flange 17 being formed on this securing or anchoring nut, if desired.
The vertical flange of the forward portion 13 of this attaching member of the buffer may be of curved or concavo-convex cross-section at its front end as shown at 18 in Fig. 3 and the coöperating connecting portion of the buffer front member may be of similar shape and firmly bolted or riveted to the flange 18 as shown in Fig. 3. The curved or concavo-convex cross-section of the resilient bars or strips 1, 2 may continue throughout the entire length of the same and serves to stiffen these parts of the buffer and enable it to better resist bending strains as compared to a flat bar, the spring yielding action of the buffer taking place largely in the end loops 4 and curved portions 5. In some cases the direction of curvature of these bent section strips may be reversed as shown in Fig. 4 in which the flanged connection portion 18ª of the attaching member is shown as formed with a concave face against which the convex face of the resilient front strip 2ª of the buffer may be secured as by the bolt 21.

In Fig. 5 another arrangement is shown which may comprise flat sectioned resilient impact receiving members 22 and 23 of spring steel or the like which may be adjustably or otherwise connected as by the clips 3. These members may be formed with end loops and with inwardly projecting connecting portions 24 to which may be bolted or otherwise connected the coöperating connecting portions 25 of the attaching members 27. These attaching members which may efficiently be made of spring steel strip are preferably formed with alining or stiffening flanges 26 on their upper edges so that as indicated in Fig. 7 the coöperating connecting portion 24 may be clamped or bolted as by the bolt 29 against the flange 26 of this connecting portion so as to secure definite alinement and strong reliable connection between the parts. In many cases it is desirable in order to secure increased rigidity of the attaching members against lateral vibration to bend or arrange them in laterally inclined position so that as shown in Figs. 5 and 6 these metal strips 27 are in oppositely vertically inclined position so as to be, if desired, at angles of about forty-five degrees from the vertical. These relatively wide thin strips therefore reinforce each other to a very considerable extent and additional stiffness is also secured by the incorporated stiffening and alining flanges 26 which may be continued throughout this part of the buffer members, if desired. These attaching members may be clamped or secured to the lamp brackets 9 and as shown in Fig. 6 these attaching members may be so arranged as to fit against the inclined lamp brackets and be held in substantially flat engagement with the under side thereof as by suitable securing bolts 15 of any desired construction. The rear ends 28 of these attaching members may be bent inward beneath the lower flanges of the frame members and secured in place as by bolts 16.

Fig. 8 shows still another form of buffer in which, if desired, a single resilient impact receiving member 30 of relatively great vertical width as compared to its thickness may be formed with integral end loops and inwardly projecting connecting portions 31 which may be substantially parallel to the adjacent front portions of this impact receiving member. By the use of tempered spring steel strip a quarter to three-eighths of an inch thick more or less and two to two and one-quarter inches or so wide in a vertical direction very much greater vertical rigidity is secured as compared to the resilient horizontal yielding of the parts under collision impact in which the buffer member may take some such position as indicated by the dotted lines in Fig. 8. This buffer front may be effectively supported and secured to the automobile by connecting thereto suitable attaching members which may have the connecting portions 32 of flanged cross-section, the flange 33 formed on the upper edge of at least this connecting portion of the attaching member being preferably of sufficient width so as to not only aline the coöperating connecting portion of the buffer front member, but also to substantially or largely conceal the same and give a better appearance to the assembled buffer. While any suitable form of connecting device may be used to securely connect or clamp together these coöperating buffer elements, one or more bolts, such as 38, which may have convex heads as indicated may extend through these coöperating connecting portions one or both of which may have somewhat elongated slots, such as 36, so as to allow the desired degree of lateral adjustment of the parts and regulate the distance apart of the attaching or clamping ends 35 of these attaching members. When a single bolt 38 is used to secure these coöperating connecting portions on one side of the buffer the adjusting slot 36 in the rear connecting portion may be amply long to secure the extent of lateral adjustment which is desirable before the nut 37 is tightened to finally rigidly connect these parts. These coöperating connecting portions may advantageously be substantially straight throughout the parts which come in contact or may be of a slightly curved contour which should not be sufficient to undesirably change the angle of the ends 35 of the attaching members when such adjustments are made. The attaching members may, if desired, be formed with outwardly curved portions adjacent their connecting portions and the resilience and contour of the parts may be such that under collision impact the resilient impact receiving or buffer front member may directly engage the attaching members so as to be reinforced and strengthened thereby after a considerable amount of resilient yielding has taken place. Additional stiffness and strength may be secured in the attaching members by continuing the alining stiffening flange 33 along the same toward or to their rear ends, and in some cases the spring steel or other stock may advantageously be originally rolled or formed with a narrow flange on one edge for instance. If desired these attaching members may in some instances be oppositely vertically inclined at least throughout part of their extent so as to secure increased stiffness against lateral vibration for the reasons indicated. As shown in Figs. 8 and 10 these oppositely inclined portions 34 may extend throughout a considerable part of the length of the attaching members which may be formed adjacent their rear ends with suitable clamping devices such as the bolt hole 39 and inclined slot 40 through which hook bolts or other connectors may extend to engage the frame flange. Fig. 11 shows another form of attaching member 46 which may have its narrow reinforcing flange 33 flattened out at the rear end of the member so as to form a clamping face or portion 45 of increased width to more effectively engage the face 41 of the automobile frame member while hook bolts 43 extending through suitable openings, such as 47, may extend around the lower frame flange 42 and be clamped against the same by suitable nuts 44.

This invention has been described in connection with a number of embodiments, forms, proportions, parts, arrangements, materials, methods of connection and use, to the details of which disclosure the invention is not of course to be limited, since what is claimed as new and what is desired to be secured by Letters Patent is set forth in the appended claims.

I claim—

1. The automobile buffer comprising a resilient buffer front composed of spring steel strip and formed with integral resilient end loops having inturned connector portions substantially parallel to the adjacent front portions, coöperating spring strip attaching members having forwardly and outwardly curved portions and end connector portions adapted to substantially conform to the corresponding connector portions of the buffer front, said attaching members each having a reinforcing alining flange projecting from its upper edge to conceal the connector portions of said buffer front, and connecting bolts passing through the coöperating connector portions to adjustably and substantially rigidly connect them.

2. The automobile buffer comprising a resilient buffer front composed of spring steel strip and formed with integral resilient end loops having inturned connector portions, coöperating spring strip attaching members having forwardly and outwardly curved portions and end connector portions adapted to substantially conform to the corresponding connector portions of the buffer front, said attaching members each having a reinforcing alining flange projecting from its upper edge, and connecting bolts passing through the coöperating connector portions to substantially rigidly connect them.

3. The automobile buffer adapted for use on Ford or similar automobiles and comprising a resilient buffer front composed of spring steel strip and formed with end loops and rearwardly extending connector portions, and coöperating flanged spring strip attaching members having connector portions adapted to substantially conform to the corresponding connector portions of the buffer front, said attaching members having oppositely vertically inclined reinforcing stiffening portions to give increased lateral rigidity.

4. The automobile buffer comprising a resilient impact receiving front member having considerably greater vertical width than thickness and formed of tempered spring steel strip and having end connecting portions, attaching members of spring steel strip having connecting portions adapted to coöperate with the connecting portions of said impact receiving member, the connecting portions of said attaching members being formed with alining reinforcing flanges adapted to aline and substantially conceal the coöperating connecting portions of said impact receiving member and connecting bolt devices to adjustably and substantially rigidly connect said coöperating connecting portions.

5. The automobile buffer comprising a resilient impact receiving front member having considerably greater vertical width than thickness and formed of steel strip and having end connecting portions, attaching members of spring steel strip having connecting portions adapted to coöperate with the connecting portions of said impact receiving member, the connecting portions of said attaching members being formed with alining reinforcing flanges adapted to aline and substantially conceal the coöperating connecting portions of said impact receiving member and connecting devices to connect said coöperating connecting portions.

6. The automobile buffer comprising a resilient impact receiving front member having considerably greater vertical width than thickness and formed of steel strip and having end connecting portions, attaching members of spring steel strip having connecting portions adapted to coöperate with the connecting portions of said impact receiving member, said attaching members being formed with flanges and connecting devices to connect said coöperating connecting portions.

7. The automobile buffer comprising a resilient impact receiving front member having end loops and inturned connecting portions and attaching members of spring steel strip having outwardly curved flanged connecting portions adapted to coöperate with the connecting portions of said impact receiving member and be secured thereto.

8. The automobile buffer comprising a resilient impact receiving front member having connecting portions and attaching members having flanged connecting portions adapted to coöperate with the connecting portions of said impact receiving member and be secured thereto.

9. The automobile buffer comprising a resilient spring steel strip impact receiving front member having inturned end connecting portions and attaching members of spring steel strip each having a bent connecting portion adapted to be secured to said impact receiving member and having an alining reinforcing flange extending substantially throughout the upper edge of said attaching member and adapted to aline and substantially conceal the coöperating connecting portion of said impact receiving member.

10. The automobile buffer comprising a resilient spring steel strip impact receiving front member having end connecting portions and attaching members of spring steel strip each having a connecting portion adapted to be secured to said impact receiving member and having a reinforcing flange extending substantially throughout the upper edge of said attaching member and adapted to substantially conceal the coöperating connecting portion of said impact receiving member.

11. The automobile buffer comprising an impact receiving front member having connecting portions and attaching members each having a connecting portion adapted to be secured to said impact receiving member and having a reinforcing flange formed on an edge of said attaching member.

12. The automobile buffer comprising a resilient impact receiving front member having connecting portions and attaching members having flanged connecting portions adapted to coöperate with and extend substantially in line with the connecting portions of said impact receiving member and be secured thereto to join said members as substantial continuations of each other.

GEORGE ALBERT LYON.